Patented Oct. 18, 1932

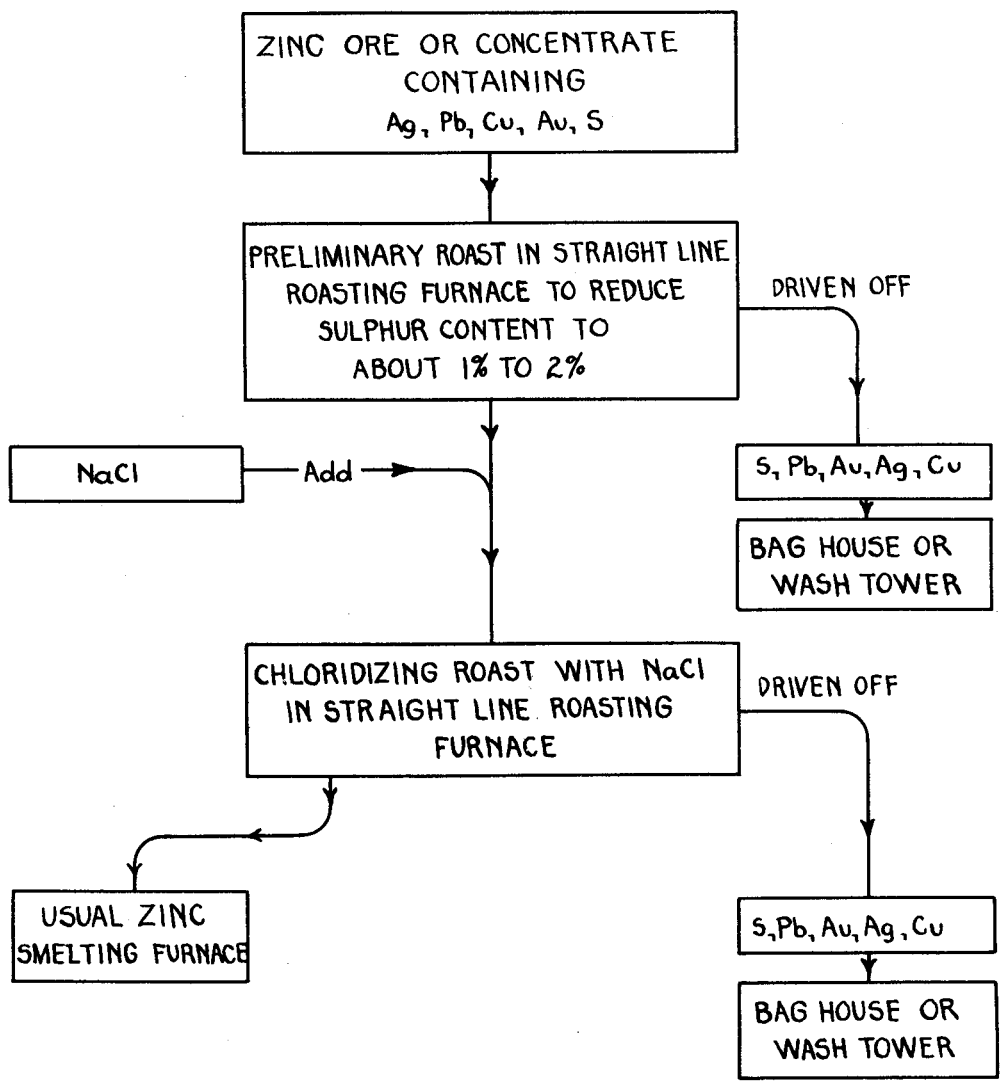

1,883,234

UNITED STATES PATENT OFFICE

LUTHER WILLIS LENNOX, OF PALO ALTO, CALIFORNIA, AND HORATIO SEYMOUR WILDMAN, OF VILLA ESCOBEDO, CHIHUAHUA, MEXICO, ASSIGNORS TO AMERICAN SMELTING & REFINING COMPANY, OF NEW YORK, N. Y., A CORPORATION OF NEW JERSEY

METHOD OF TREATING ZINC ORES

Application filed February 7, 1929, Serial No. 338,082. Renewed April 25, 1932.

The invention relates to the metallurgy of zinc, and more particularly to a method of chloridizing certain metals which may be contained in zinciferous material before treating such material to recover the zinc.

According to the invention certain impurities, such as lead and copper, frequently associated with zinc in zinc ores, and also precious metals, are effectively removed by subjecting the zinc bearing material to a preliminary roast to reduce the sulphur content and then subjecting the resultant product to a chloridizing roast whereby lead, copper and precious metals are driven off as chlorides.

It has been found that sodium chloride is a suitable reagent for use in the chloridizing roast to increase the percentage of impurities volatilized. It has also been found that this reagent is beneficial in the subsequent treatment of the zinc bearing material in the usual zinc smelting furnaces for recovering the zinc.

Various other features and advantages of this invention will be apparent from the following particular description of the several steps employed in practicing the same and from an inspection of the accompanying drawing comprising a flow sheet illustrating the process, and it will be understood that the said steps may be modified in various respects without departing from the broad spirit and scope of the invention.

The complex zinc ores or zinc concentrates containing various metals as impurities, such as lead, copper, silver and gold, are charged into a suitable roasting furnace, preferably of the straight line type, such as an Edwards, Ropp or Skinner furnace and the sulphur content is reduced to approximately one percent if practical. However, reduction to two percent or less of sulphur is sufficient in most cases, and with some ores a reduction to three percent or less gives satisfactory results. Some of the metal impurities, especially lead, may be driven off in this preliminary or oxidizing roast, so it is desirable that provision be made to collect the fume in a suitable manner as in a bag house or wash tower.

After the preliminary or oxidizing roast, and preferably while the charge is still in the roasting furnace and without necessarily lowering the temperature to any substantial extent, a chloridizing agent such as sodium chloride is mixed therewith. The mixture is then subjected to a second roasting operation. The quantity of the chloridizing agent is determined, of course, by the percentage and the character of the impurities in the charge. The temperature is so regulated that the greater part if not all of the metals other than zinc are driven off as chlorides without volatilizing the zinc. These metals comprise practically all of the remaining lead, copper, gold and silver. In addition a substantial amount of the remaining sulphur is also driven off. Suitable means for the recovery of the fume, such for example as wash towers or bag houses are provided or a Cottrell high voltage precipitation apparatus may be used.

The resulting product from the second roasting operation is removed from the roaster and is subjected to any desired or usual zinc smelting treatment to recover the zinc. Any small amount of uncombined salt or other chloride remaining in the roast is not deleterious but is frequently advantageous in the subsequent step of retort smelting. It will be obvious that the chloridizing roast may be carried out in another furnace or in a separate apparatus although the addition of the proper reagent to the charge without removing it from the furnace conserves heat and saves time.

While certain novel features of the invention have been shown and described and are pointed out in the annexed claims, it will be understood that various omissions, substitutions and changes may be made by those skilled in the art without departing from the spirit of the invention.

What is claimed is:

1. The process of treating zinc-bearing materials of a sulphide character containing metallic impurities including lead, which comprises subjecting the zinc-bearing material to an oxidizing roasting treatment to remove sulphur from said material, discontinuing said roasting treatment when the content of sulphur has been reduced to less than about 3%, mixing sodium chloride with said roasted ore having a sulphur content of less than about 3% without lowering the temperature of said roasted ore to any substantial extent, subjecting the mixture of roasted ore and sodium chloride to heat sufficiently intense to fume off metallic impurities including lead but insufficient in intensity to cause the volatilization and loss of zinc, and thereafter smelting said zinc-bearing materials freed from lead to effect a recovery of zinc therefrom.

2. The method of treating complex zinc ores and concentrates of a sulphide character containing impurities including substantial amounts of lead, copper, gold and silver, which comprises subjecting said ores and concentrates of zinc to an oxidizing roasting treatment in a straight line roasting furnace, continuing said roasting treatment until the sulphur content is reduced to an amount less than about 3%, after the sulphur content has been reduced as aforesaid and before the said roasted ore has been lowered in temperature to any substantial extent mixing sodium chloride with the roasted zinc material containing less than about 3% of sulphur, heating the mixture of sodium chloride and zinc material in a straight line roasting furnace to a temperature sufficiently high to fume off metallic impurities including lead, gold, silver and copper, but not high enough to volatilize zinc, continuing said heat treatment to effect a removal of metallic impurities including lead, gold, silver and copper and thereafter smelting the zinc material freed from lead, gold, silver and copper for the recovery of zinc.

3. The method of treating zinciferous material of a sulphide character containing impurities including lead, gold, silver and copper, which comprises subjecting the said zinciferous material to an oxidizing roasting treatment in a straight line roasting furnace, discontinuing said oxidizing roasting treatment when the sulphur content of the material has been reduced to an amount less than about 3%, while said roasted material is in a heated condition mixing a chlorine containing agent with said roasted material having a sulphur content thereof reduced to less than about 3%, heating the mixture of roasted zinciferous material having a sulphur content less than about 3% and said chlorine containing agent to a temperature sufficiently high to fume off metallic impurities including lead, gold, silver and copper, but insufficient to cause the volatilization and loss of zinc and then smelting said purified zinciferous material freed from lead, gold, silver and copper for the recovery of zinc.

In testimony whereof we have hereunto set our hands.

LUTHER WILLIS LENNOX.
HORATIO SEYMOUR WILDMAN.